United States Patent Office 2,712,828
Patented July 12, 1955

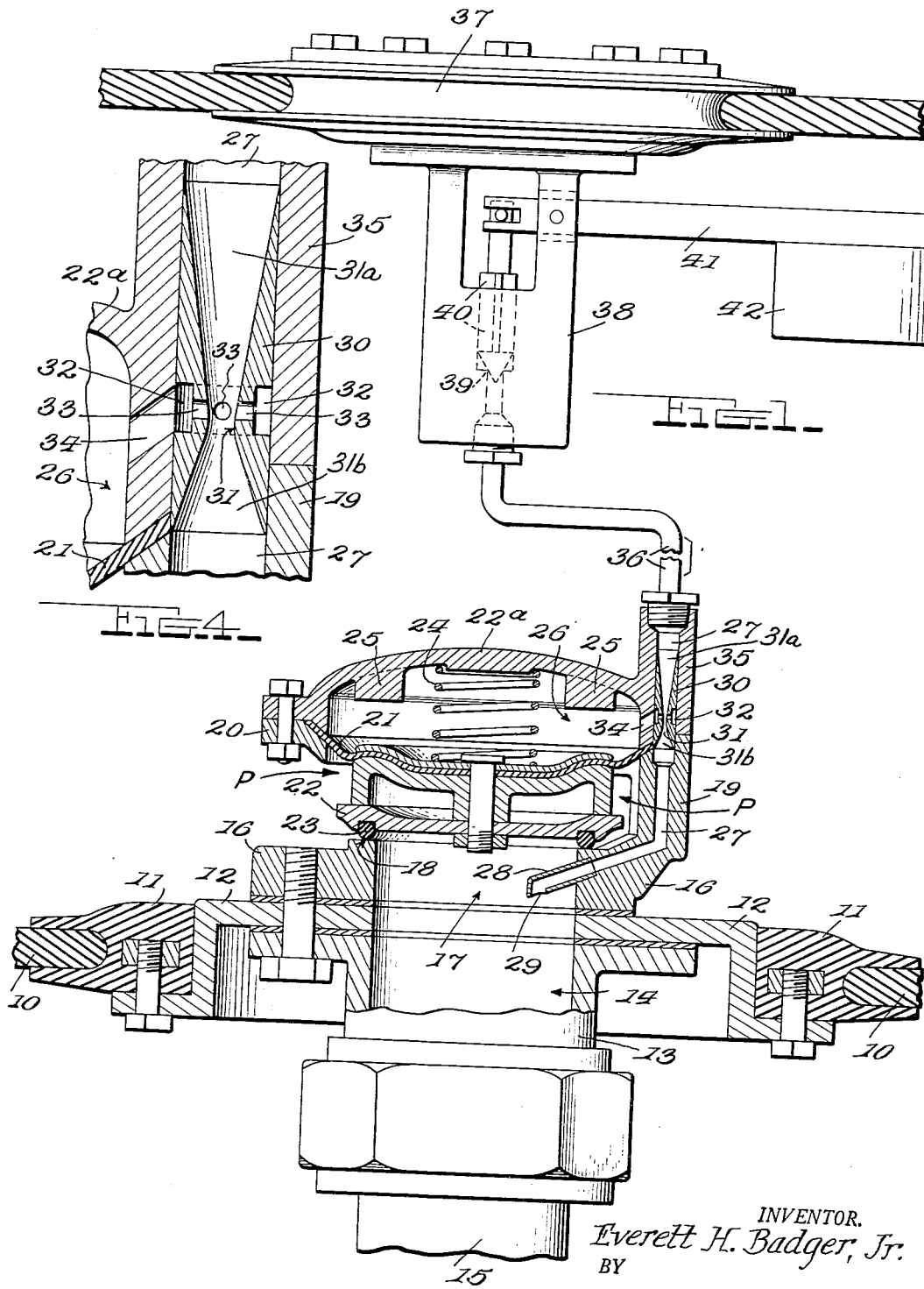

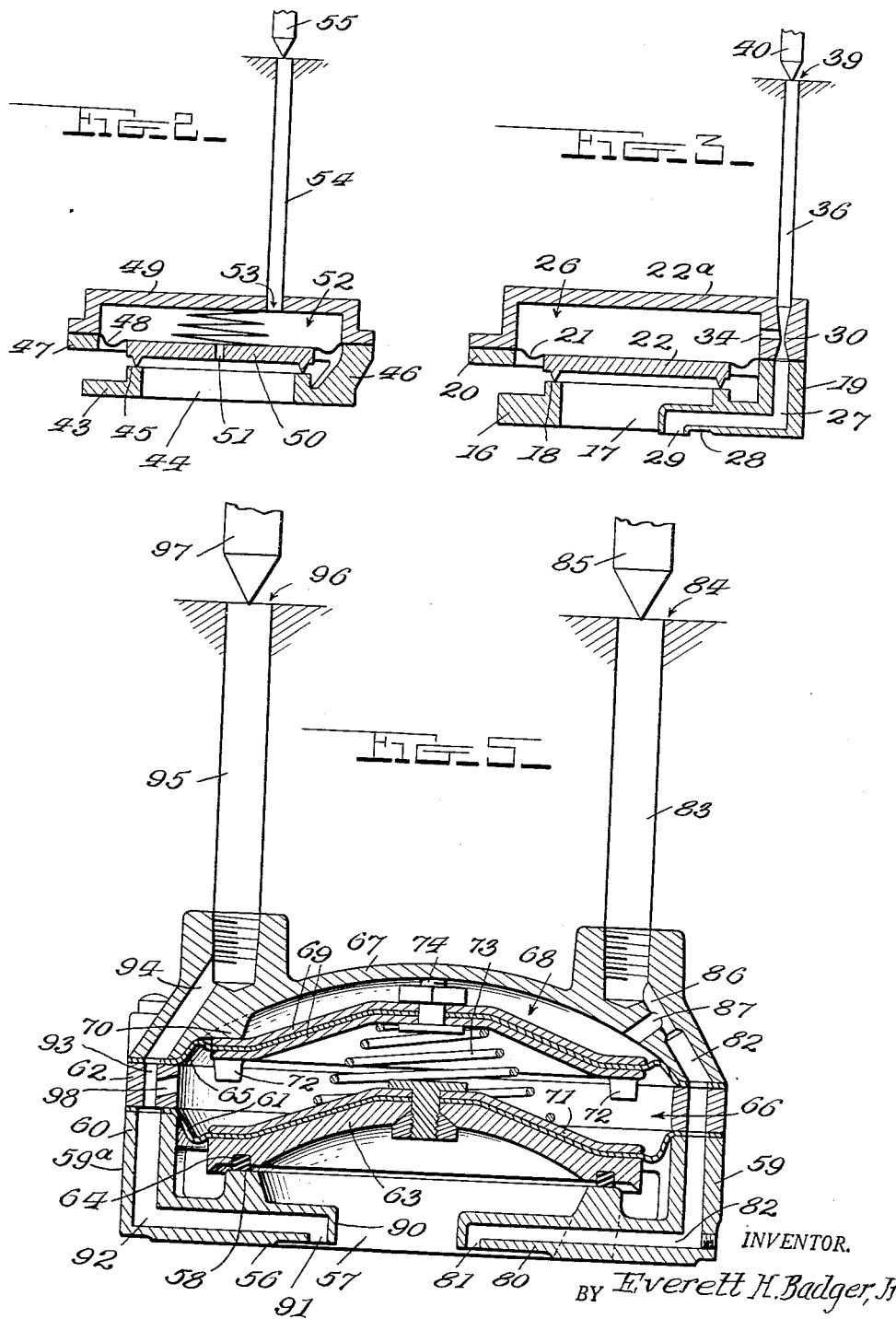

2,712,828

VALVE MECHANISM FOR FILLING AND CONTROLLING THE LEVEL OF FLUID IN A TANK

Everett H. Badger, Jr., Los Angeles, Calif., assignor to The Parker Appliance Company, Cleveland, Ohio, a corporation of Ohio Application January 16, 1953, Serial No. 331,717

5 Claims. (Cl. 137—414)

The invention relates to new and useful improvements in a valve mechanism for filling tanks which valve mechanism includes a main fluid pressure operated valve controlled by a float operated pilot valve.

The present invention is particularly adapted for use in aircraft fueling systems in connection with the filling of the tanks directly from a ground source or in connection with the transfer of fuel from one tank to another. The main valve operates to admit fuel to the tank when the fuel level drops to a certain level and operates to shut off the incoming fuel when the fuel in the tank reaches a predetermined level. The valve is moved to open position by the pressure of incoming fluid on the underside of the valve and is closed by the pressure on the fluid in a chamber contacting the opposite side of the valve. Which way the valve moves depends on whether the balance in pressure is on the upper side of the valve or on the underside thereof. In the present type of fluid operated valves the spread in the pressures is so small that sometimes the main valve fails to open to its full extent and this will increase the time required to fill the tank to a desired level which, of course, is objectionable.

An object of the present invention is to provide a fluid operated mechanism for filling tanks wherein the differential in the pressure operating on the opposite sides of the valve is of such wide spread that the valve when opened to permit the tank to be supplied with fuel will be moved with certainty to a full open position.

A further object of the invention is to provide a valve mechanism of the above type wherein the flow channel leading to the float controlled pilot line is connected directly with the fluid supply at the intake side of the valve and the pressure chamber is connected to the flow channel at a restricted passage therein so that the fluid pressure on the chamber will be materially reduced from that on the fluid supply to facilitate the quick and full opening of the main valve for the filling of the tank.

A still further object of the invention is to provide a valve mechanism of the above type wherein the restricted passage in the flow channel is obtained by a venturi tube and the pressure chamber is connected to the flow channel at or near the maximum resistance to the flow of the fuel through the venturi tube.

These and other objects will in part be obvious and will in part be hereinafter more fully disclosed.

In the drawings:

Figure 1 is a vertical sectional view through a valve mechanism embodying the improved construction and also a more or less diagrammatic view of the pilot line and the float controlled valve therefor.

Figure 2 is a schematic sectional view through the essential parts of a conventional pilot controlled fluid operated valve mechanism for filling tanks.

Figure 3 is a schematic sectional view through the essential parts of applicant's pilot controlled fluid operated valve mechanism for filling tanks.

Figure 4 is an enlarged sectional view through the venturi tube, a portion of the flow channel in which the tube is located and the connection of the fluid pressure chamber to the flow channel.

Figure 5 is a vertical sectional view showing more or less diagrammatically a modified form of valve supporting mechanism and the fluid pressure chambers associated therewith.

In the illustrated embodiment of the invention as shown in Figure 1, the improved valve mechanism is mounted on the bottom of the tank to be filled and the float controlled operating mechanism is mounted on the top of the tank. The main valve mechanism may however be mounted at either the top or the bottom of the tank and hence is either in the same housing as the pilot valve or is spaced a considerable distance away therefrom.

The tank may be of any suitable construction. The bottom wall 10 has an opening therethrough in which is located an adapter 11. The base plate 12 for the valve housing is secured to the adapter and has a portion fitting in the opening. On the underside of the base plate 12 is a tubular member 13 having a flow passage 14 therethrough.

The pipe 15 is connected to said tubular member. This pipe may lead to a ground supply of fuel or to other tanks. In either case the fuel is directed through the pipe under pressure. The lower portion of the valve housing 16 has an intake opening 17 surrounded by a valve seat 18. Arising from the housing 16 are supporting ribs 19, one of which is shown in Figure 1. These ribs are spaced from each other to provide ports disposed about the valve seat 18 and leading to the tank. Formed integrally with the ribs is an annular member 20 providing a support for the peripheral portion of a diaphragm 21. The diaphragm is clamped against the seat by a cap 22ª attached to the annular member 20.

Rigidly mounted on the central portion of the diaphragm is the main valve 22 provided with a gasket 23 adapted to engage the valve seat 18 when the valve is in closed position. This valve cuts off the flow of fluid from the intake pipe through the opening 17 to the tank. The valve 22 is urged toward closed position by a spring 24. Stops 25, 25 are formed on the inner face of the cap with which the valve makes contact when in full open position.

Between the diaphragm and the cap is a pressure chamber 26. The diaphragm forms a movable wall of the chamber. Fluid pressure on the upper side of the diaphragm will move the valve to closed position and fluid pressure on the underside of the valve will move the same to full open position against the stops 25, 25. Which way the valve moves depends on the balance of the pressure against the opposite sides of the valve, whether it is on the bottom side of the valve or on the top side thereof.

Extending through a base plate of the housing, up through one of the ribs and through the cap is a flow passage 27, for the fluid. At the lower end of the passage is a pickup 28 which extends into the fluid flow channel at the intake side of the main valve. This pickup 28 has an opening 29 on its underside which faces the incoming fuel. Disposed in this passage is a venturi tube 30. The tube has a restricted portion or throat 31 intermediate the ends of the tube. The passages leading to and from the throat taper outwardly. On the outer face of the tube is an annular recess 32 connected by spaced ports 33 to the interior of the tube. These ports are disposed substantially at the point of greatest resistance to the flow of fluid through the venturi tube. There is an opening 34 extending through the wall of the pressure chamber and connecting said chamber to this annular recess 32 and by the ports 33 to the interior of the venturi tube. The area of the restricted passage 31 is less than the combined area of the ports 33.

The cap has an extension 35 in which is located the passage 27 and the outer end portion of the extension is counterbored and threaded to receive the pilot line tube 36.

At the upper side of the tank is a bracket 37 on which a pilot valve housing 38 is mounted. The housing has a passage therethrough and the pilot tube is connected to this passage. At the upper end of the passage is a valve seat 39 adapted to be engaged by the pilot valve 40. Pivotally supported on the housing 38 is a lever 41. This lever is attached to the pilot valve at one end and is connected to the float 42 at its other end.

In Figure 3 there is shown a schematic representation of the valve arrangement above described in detail and the reference numerals used above have been applied to some of the essential parts of the valve mechanism.

In Figure 2 there is shown for comparison a schematic view of the essential parts of a conventional type of valve mechanism used for filling tanks wherein the main valve is opened and closed by fluid pressure under control of a float operated pilot valve.

It is believed that the functioning and advantages of the present improved valve mechanism will be better understood by a comparison with the conventional type. Briefly, this conventional type of valve mechanism shown in Figure 2 includes a base plate 43 having an intake opening 44 surrounded by a valve seat 45. Arising from the base plate are spaced ribs 46 carrying an annular member 47 to which the peripheral portion of a diaphragm 48 is clamped by a cap 49. The diaphragm carries a valve 50 adapted to engage the valve seat 45. Centrally of the valve is a restricted opening 51 connecting the intake side of the valve to the pressure chamber 52. In the cap is an opening 53 to which a pilot line tube 54 is connected and at the upper end of the tube is a valve seat and a float controlled valve 55 which engages the seat at a predetermined level of the fluid in the tank.

In the conventional type shown in Figure 2, in order that the main valve 50 may open under the influence of fluid pressure on the inlet 44, it is necessary that the pressure chamber inlet orifice 51 be of smaller flow capacity than the outlet 53, pilot line tube 54 and the pilot valve 55. This permits fluid to exhaust from the pressure chamber faster than it enters the chamber and hence prevents a build-up of fluid pressure in the chamber 52 which would be sufficient to close the main valve against the pressure of the incoming fluid as long as the pilot valve 55 is open. To state it another way, if the pressure drop in the passages 53, 54 and 55 total more than the pressure drop across the inlet orifice 51, the fluid will have more difficulty in getting out of the pressure chamber than getting in and hence there will be a tendency to equalize the pressure between the inlet 44 and the pressure chamber 52 and cause the main valve to close. Not only must the inlet orifice 51 be smaller, that is, have a larger pressure drop than the passages 53, 54 and 55, but the relationship between the two affects the speed with which the main valve opens and closes, assuming that all other factors remain constant.

In the opening of the main valve of the conventional type shown in Figure 2 the incoming fluid presses against the bottom of the valve to lift it off its seat. Some of the fluid passes through the orifice 51 into the pressure chamber 52 and out through the pilot system. Assuming that the pressure chamber 52 was initially full of fluid the opening of the main valve would be resisted by the displacement of fluid through the pilot system from the pressure chamber 52. The amount of fluid pressure developed in the chamber 52 depends upon several things but it will be readily seen that the larger the openings in the passages 53, 54 and 55 the less pressure would be required to force the fluid therethrough. Hence if these passages were made large size the main valve would open more quickly. Likewise, if the inlet orifice 51 was made a smaller size the less fluid there would be passing into the chamber 52 to be eventually displaced through the lines 53, 54 and 55 and hence the time required to open the main valve would again be reduced. In other words, the greater the differential between the flow capacities of the inlet orifice 51 and the pilot passages 53, 54 and 55 the quicker will be the time for opening. To close the main valve it is necessary that the pilot valve 55 cut off flow of fluid from the pressure chamber 52. In addition it is necessary to continue to introduce fluid through the inlet orifice 51 for displacing the main valve downwardly, the pressure chamber 52 being expansible in this respect. After the pilot valve has closed off, the time in which it takes the main valve to close depends on how fast the fluid can pass through the orifice 51 to enlarge the pressure chamber 52 and this time depends directly on the size of the orifice 51, the larger the orifice the shorter the time.

From the above description it will be noted for fast opening of the valve the orifice 51 should be small but for fast closing it should be large. Obviously, the orifice cannot be both and thus it is necessary to do a certain amount of compromising. It follows that in this conventional type of valve mechanism the opening of the valve could be improved at the expense of slower closing and vice versa by simply changing the differential between the size or flow capacity of the orifice 51 and the pilot line passages.

Referring to Figure 3 which shows the improved arrangement, the valve mechanism is both structurally and functionally quite different from the conventional type. In the improved valve mechanism there is no orifice in the main valve 22 but there is a pilot line pick-up opening which extends into the inlet 17. The opening 29 leads to a passage extending through the housing of the valve and connected directly to the pilot line tube 36 and the pilot valve housing 38. This connection to the pilot line is not through the pressure chamber but is at one side thereof, and an opening 34 through the wall of the fluid pressure chamber connects the pressure chamber 26 with the throat 31 of the venturi tube. This opening 34 serves as both an inlet and outlet to the pressure chamber.

Since the pressure chamber 26 is in open communication with the venturi orifice the static fluid pressure within the chamber will be substantially the same as that in the venturi orifice. Because of the venturi action the fluid pressure in the venturi throat 31 will be less than at either side 31a or 31b. With all other factors equal the pressure at 31a will be about the same as the pressure at 53 in the conventional type since this pressure is dependent upon the size and length of the pilot line tube, the opening in the pilot valve and the height (head) at which the pilot valve is mounted.

In the conventional form, (Figure 2) the pressure within the chamber 52 is substantially the same as at the outlet 53. Since the pressure in the venturi orifice 31 is lower than at 31a it follows that the pressure within the corresponding chamber 26 of Figure 3 is lower than the pressure in the chamber 52 of Figure 2.

It also follows that with lower unit pressure in the chamber 26 there is a greater overbalance of pressure tending to open the main valve and the time of opening in applicant's improved form is shorter than in the conventional type when the orifice 31 is the same size as the orifice 51, and the pilot line openings for the two valves are the same. Conversely the venturi orifice could be a larger size and still result in the same opening time as in the conventional type.

Referring again to Figure 3, in closing the main valve 22 the pilot valve 40 has shut off the flow through the pilot system and the time of closing will depend upon how fast fluid can flow through the pick-up 29 and the venturi orifice into the pressure chamber 26 through the opening 34. The venturi orifice 31 is the smallest of these passages and hence has the greatest effect upon the closing time. If the orifice 31 is the same size as the orifice 51 in Figure 2 the closing times will be substantially the same. However, if the venturi orifice 31 has been made larger (since this could be done without increasing the opening time over Figure 2) the closing time will be shorter.

Not only is it desirable for the main valve to open quickly, it is also very important that the main valve open to the full intake capacity during the filling operation and remain in full open position. In the conventional type shown in Figure 2, as the main valve opens there is a loss in the pressure operating on the underside of the main valve due to the flow of fluid into the tank. Hence the unit pressure in the chamber 52 due to the back pressure developed in the pilot system becomes more nearly the same as the pressure against the valve for opening the same. If there is insufficient spread between the pressures on opposite sides of the main valve, when the valve begins to open the pressures will reach a point where they balance each other before the valve is fully open. The venturi in applicant's improved valve mechanism helps this situation by providing a lower fluid pressure in the chamber 26 and hence a greater spread between that pressure and the one acting on the lower side of the main valve.

It is apparent from the above that in applicant's improved valve mechanism the valve may be opened quickly to its full extent by reason of the fact that the pressure in the chamber 26 is reduced through the action of the venturi and its arrangement relative to the opening 34 and the valve may be closed just as quickly as in the conventional type when the venturi passage is made of the same size as the restricted opening through the valve in said conventional type.

Another advantage is that when the Venturi tube is used the pilot valve may be mounted at a greater height above the main valve. This greater height increases the head pressure in the pilot tube. This, plus the added pressure drop in the extra length results in a greater pressure at the point 31ᵃ and hence the venturi orifice 31. The lengthening of the pilot tube in this manner may be accomplished until the pressure in the venturi orifice 31 becomes the same as the pressure in the outlet 53 of the conventional type. For similar reasons the pilot tube 36 and the pilot valve 40 may be of smaller flow capacity and hence of less weight than the pilot tube 54 in the conventional type.

Another advantage is that the venturi permits a larger safety factor between the highest pressure drop permissible in the pilot system (above which the back pressure in the chamber 26 would become too great to permit proper opening of the valve) and the actual pressure drop of the pilot system. This large safety factor would also permit greater variation in the actual pressure drop of the pilot system due to dimensional differences incurred during production of the parts.

The venturi type orifice may be applied to a double diaphragm valve such as shown in Figure 5 of the drawings. In this type of valve there are two independent fluid pressure chambers, two pilot lines, one for each chamber and a float controlled pilot valve for each pilot line, the pilot lines and the float controlled valves are shown in this Figure 5 diagrammatically. It is understood, however, that these pilot lines and float controls, while independent are the same as shown in Figure 1. This double diaphragm fluid pressure controlled valve includes a housing having a base plate 56 through which is an inlet opening 57 surrounded by a valve seat 58. Arising from the base plate 56 are spaced ribs 59 and 59ᵃ. Mounted on these ribs is a ring member 60 against which a diaphragm 61 is clamped by means of a second ring 62. Attached to the diaphragm is a valve 63 carrying a gasket 64 which is adapted to engage the valve seat 58 and control the flow of fluid into the tank. Mounted on the opposite side of the second ring is a secondary diaphragm 65. Between the diaphragms 61 and 65 is a fluid pressure chamber 66. The diaphragm 65 is clamped against the second ring by a cap 67. Between the diaphragm 65 and the cap is a secondary fluid pressure chamber 68. The diaphragm 65 is provided with plates 69 which makes the central portion of the diaphragm rigid. There is a plate above the diaphragm and a plate below the same. The plate above the diaphragm contacts with stops 70 formed on the cap and the plate 71 carried at the upper side of the diaphragm 61 contacts with stops 72. There is a spring 73 disposed between the two diaphragms which tends to move the upper diaphragm so that a center plug 74 rigidly attached to the diaphragm will contact with the cap 67. This spring also tends to move the valve into contact with the valve seat.

Extending into the inlet passage is a pick-up 80 having an opening 81 facing downwardly and against the inflowing fluid. This pick-up opening 81 connects to a passage 82 extending through one of the ribs 59 and the second ring 62 into and through the cap 67. A pilot line tube is connected to the cap and the passage 82 leads into the pilot line tube 83. At the upper end of the pilot line tube is a valve seat 84 with which a float controlled valve 85 cooperates. This pilot line tube 83 and the pilot valve are shown only diagrammatically in this figure, but they are of similar construction to the pilot line assembly shown in Figure 1.

The passage 82 through the cap has a restricted portion 86. The fluid pressure on the passage 82 will drop in this restricted portion of the flow channel. An opening 87 through the wall of the secondary fluid pressure chamber 68 connects the secondary fluid pressure chamber to the passage 82 intermediate the ends of the restricted portion. This opening 87 is slightly larger than the diameter of the restricted passage 86. The restricted passage 86 functions in effect the same as the venturi tube shown in Figure 1. The fluid pressure in the restricted portion 86 of the flow passage 82 will be less than the fluid pressure leading to the restricted portion and, therefore, the fluid pressure on the secondary chamber will be less than the fluid pressure in the passages 82 and 83.

There is another pick-up 90 having an opening 91 facing downwardly and against the inflowing fluid. The opening 91 connects to a passage 92 extending through the rib 59ᵃ up to the second ring 62. At this point the passage 92 connects to a restricted passage 93 which in turn connects to a larger passage 94 which leads to a pipe 95 and a valve seat 96 which is controlled by a primary pilot valve 97. Leading from the restricted passage 93 there is another larger passage 98 which connects to the primary fluid chamber 66. Because of the venturi action afforded by the restricted passage 93, the fluid pressure therein will be less than in the passages 92 and 94 and the pressure within the primary chamber 66 will be substantially the same as that in the restricted passage 93.

The primary purpose of the double diaphragm type of valve is to insure operation of the main valve even though one of the diaphragms should break. If the diaphragm 61 should break, pressure in the secondary chamber 68 would force the upper diaphragm 65 downwardly against the lower diaphragm assembly which carries the valve to a closed position. On the other hand, if the diaphragm 65 should break the fluid pressure within the chamber 66 would force the lower diaphragm assembly into valve closing position. Normally, the spring tends to keep the secondary assembly in its uppermost position and the primary assembly in the valve closing position. When the fluid supply is connected to the inlet port 57 the secondary assembly remains motionless but the primary assembly raises the valve to open position. The time and extent of opening, with all other factors constant, depends upon the flow capacity relationship between the primary restricted passage 93 and the primary pilot system. In closing the valve, if the primary diaphragm 61 does not break, the time of closing will depend not only upon how fast the chamber 66 will fill through the passage 93, but will also depend upon whether or not the upper assembly will move downwardly.

Whether or not the assembly will move downwardly depends upon whether the restricted passage 86 has a greater flow capacity than the restricted passage 93. If the restricted passage 86 is the same or smaller than the restricted passage 93 then there will be no downward movement of the secondary assembly and the primary assembly will function to close the valve.

It is obvious that minor changes in the details of construction and the arrangement of the parts may be made without departing from the spirit of the invention as set forth in the appended claims.

I claim:

1. A fluid pressure operated valve mechanism comprising a housing having an inlet surrounded by a valve seat, a valve for controlling the flow of fluid through the inlet, means for supporting said valve, said housing having a fluid pressure chamber above the valve of which chamber the valve forms a movable wall, said housing having a flow passage at one side of and separated from the pressure chamber and leading from the intake side of the valve to the upper side of the housing, said passage intermediate the ends thereof being restricted for reducing the fluid pressure in the flow stream at said restriction, the wall of said fluid pressure chamber having an opening connecting the chamber to said flow passage at substantially the restriction therein.

2. A fluid pressure operated valve mechanism comprising a housing having an inlet surrounded by a valve seat, a valve for controlling the flow of fluid through the inlet, means for supporting said valve, said housing having a fluid pressure chamber above the valve of which chamber the valve forms a movable wall, said housing having a flow passage at one side of and separated from the pressure chamber and leading from the intake side of the valve to the upper side of the housing, said passage intermediate the ends thereof being shaped so as to provide a venturi reaction on the flowing fluid for reducing the fluid pressure at the venturi, the wall of the fluid pressure chamber having an opening connecting the chamber to the flow passage substantially at the venturi.

3. A fluid pressure operated valve mechanism for a tank comprising a housing having an inlet surrounded by a valve seat and ports disposed above the valve seat and leading to the tank, a diaphragm disposed above said ports and attached at its outer margin to said housing, a valve attached to the diaphragm and adapted to engage said valve seat for cutting off the flow of fluid to the tank, a fluid pressure chamber disposed above said diaphragm, said diaphragm forming a flexible wall closing said chamber, said housing having a flow passage at one side of and separated from the pressure chamber and leading from the intake side of the valve to the upper side of the housing, said passage intermediate the ends thereof being restricted for reducing the fluid pressure in the flow stream, the wall of said fluid pressure chamber having an opening connecting the chamber to said flow passage substantially at the restriction therein.

4. A fluid pressure operated valve mechanism for a tank comprising a housing having an inlet surrounded by a valve seat and ports disposed above the valve seat leading to the tank, a diaphragm disposed above said ports and attached at its outer margin to said housing, a valve attached to the diaphragm and adapted to engage said valve seat for cutting off the flow of fluid to the tank, a fluid pressure chamber disposed above said diaphragm, said diaphragm forming a flexible wall closing said chamber, said housing having a flow passage at one side of and separated from the pressure chamber and leading from the intake side of the valve to the upper side of the housing, said passage intermediate the ends thereof being shaped so as to provide a venturi reaction on the flowing fluid for reducing the fluid pressure at the venturi, the wall of said fluid pressure chamber having an opening connecting the chamber to said flow passage substantially at the venturi therein.

5. A fluid pressure operated valve mechanism having a tank comprising a housing having an inlet surrounded by a valve seat and ports disposed above the valve seat and leading to the tank, a diaphragm disposed above said ports and attached at its outer margin to said housing, a valve attached to the diaphragm and adapted to engage said valve seat for cutting off the flow of fluid to the tank, a fluid pressure chamber disposed above said diaphragm, said diaphragm forming a flexible wall closing said chamber, said housing having a flow passage leading from the intake side of the valve to the upper side of the housing, a pilot line tube attached to said housing and connected to said flow passage, a float controlled valve for controlling the flow of fluid through said pilot line, said passage intermediate the ends thereof in the housing being restricted for reducing the fluid pressure in the flow stream at said restriction, the wall of said fluid pressure chamber having an opening connecting the chamber to said flow passage at substantially the restriction therein.

References Cited in the file of this patent

UNITED STATES PATENTS

| 2,548,354 | Davies | Apr. 10, 1951 |

FOREIGN PATENTS

| 5,563 | Germany | 1878 |
| 35,497 | Denmark | 1925 |
| 49,473 | Switzerland | 1909 |